(12) United States Patent
D'Aversa et al.

(10) Patent No.: US 9,831,659 B2
(45) Date of Patent: Nov. 28, 2017

(54) MOTOR RELAY WITH INTEGRATED ARC-FLASH DETECTION

(71) Applicant: Schweitzer Engineering Laboratories, Inc., Pullman, WA (US)

(72) Inventors: Angelo D'Aversa, Ambler, PA (US); James R. Kesler, Pullman, WA (US); Robert I. Jayne, Spokane Valley, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/141,599

(22) Filed: Apr. 28, 2016

(65) Prior Publication Data

US 2016/0247653 A1    Aug. 25, 2016

Related U.S. Application Data

(63) Continuation of application No. 13/600,727, filed on Aug. 31, 2012, now Pat. No. 9,438,028.

(51) Int. Cl.
| | |
|---|---|
| *H02K 29/10* | (2006.01) |
| *H02H 5/04* | (2006.01) |
| *H02P 29/02* | (2016.01) |
| *H02H 1/00* | (2006.01) |
| *H02H 3/10* | (2006.01) |
| *H01H 71/12* | (2006.01) |
| *H01H 83/00* | (2006.01) |

(Continued)

(52) U.S. Cl.
CPC ............ *H02H 5/042* (2013.01); *H01H 71/12* (2013.01); *H01H 83/00* (2013.01); *H02H 1/0015* (2013.01); *H02H 3/10* (2013.01); *H02P 29/00* (2013.01); *H02P 29/02* (2013.01); *H01H 2083/201* (2013.01); *H02H 7/08* (2013.01)

(58) Field of Classification Search
USPC .............. 318/790, 563, 400.21, 400.22, 782; 361/93.2, 94, 7, 5, 6, 63, 115, 42, 93.1, 361/44, 20, 23; 324/527, 424, 551
See application file for complete search history.

(56) References Cited

U.S. PATENT DOCUMENTS

5,986,860 A  *  11/1999  Scott  ................... G01R 31/025
                                                    361/115
7,359,168 B2     4/2008  Elms
(Continued)

*Primary Examiner* — Jorge L Carrasquillo
(74) *Attorney, Agent, or Firm* — Richard M. Edge; Jared L. Cherry (57) ABSTRACT

Disclosed herein are various embodiments of devices and related methods for detecting an electrical arc event using a motor management relay and for suppressing the electrical arc event. The motor management relay may incorporate an optical arc-flash sensor configured to detect an optical event. Control logic may analyze the optical event and determine whether the optical event corresponds to an electrical arc event. When an electrical arc event is detected an instruction may be issued via a control port in communication with the control logic to implement a protective action. According to various embodiments, a plurality of sensors for monitoring electrical characteristics of a motor may also be in communication with the control logic. Input from the sensors may be analyzed in order to determine whether the optical event corresponds to an electrical arc event.

20 Claims, 9 Drawing Sheets

(51) Int. Cl.
*H02P 29/00* (2016.01)
*H02H 7/08* (2006.01)
*H01H 83/20* (2006.01)

(56) References Cited

U.S. PATENT DOCUMENTS

| | | | |
|---|---|---|---|
| 8,947,246 B2 | 2/2015 | Aiken | |
| 2005/0135025 A1* | 6/2005 | Escoda | H02H 1/0015 361/42 |
| 2008/0239592 A1* | 10/2008 | Roscoe | H01T 2/02 361/7 |
| 2008/0310058 A1* | 12/2008 | Premerlani | H01H 59/0009 361/42 |
| 2010/0073013 A1* | 3/2010 | Zeller | G01R 31/3277 324/551 |
| 2013/0193987 A1* | 8/2013 | Kesler | G01R 3/00 324/654 |

\* cited by examiner

MOTOR RELAY WITH INTEGRATED ARC-FLASH DETECTION

RELATED APPLICATIONS

This application claims priority under 35 U.S.C. §120 as a continuation application of U.S. patent application Ser. No. 13/600,727 filed on 31 Aug. 2012 and titled "Motor Relay with Integrated Arc-Flash Detection", which is incorporated herein by reference.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Disclosed herein are various embodiments of devices and related methods for detecting an electrical arc event using a motor control relay and for suppressing the electrical arc event. An electrical arc event is a dangerous condition associated with the release of energy caused by an electric arc. Electrical arc events may produce temperatures up to 19,000° C. (35,000° F.) or more. In comparison, arc furnaces may operate at temperatures of 1,600° to 3,000° C. (3,000° to 5,000° F.). In addition to generating extreme temperatures, an electrical arc event may also result in high levels of radiated energy including thermal energy and ultraviolet energy, flying shrapnel, pressure waves, and sound waves.

An arc flash may also produce electro-optical radiation, including visible and ultraviolet light, in the vicinity of the electrical arc. An optical sensor may be utilized to detect an arc flash (e.g., the emission of electro-optical radiation) associated with an electrical arc event. Use of an optical sensor may help to reduce the "total arcing time" associated with an electrical arc. The "total arcing time" refers to the total time required to detect the electrical arc and to actuate protective elements in order to interrupt the flow of electrical current feeding the arc. In certain circumstances, the "total arcing time" may be used to calculate the energy released by the electrical arc event, which may be related to the potential damage that could be caused by the electrical arc. Accordingly, reducing the "total arcing time" may improve the safety and/or reliability of an electrical power system.

Various embodiments disclosed herein may rely upon optical detection of an electrical arc and optionally the detection of abnormal electrical conditions (e.g., excessive current) in order to determine whether protective elements should be actuated in order to disrupt the flow of electrical current to a motor. The sensitivity of a particular system may be selected to provide a balance between adequate protection against electrical arc events and unnecessary interruptions based upon the incorrect identification of an electrical arcing event (e.g., a false positive detection of an electrical arc event). In certain instances, the detection of an optical event indicative of an electrical arc may be sufficient to trigger protective action, while in other instances the detection of an optical event and abnormal electrical conditions may both be necessary to implement corrective action (e.g., disrupting the flow of electrical current to a motor).

In North America, motor management relays are commonly installed in motor control center ("MCC") buckets. As the term is used herein, an MCC bucket refers to an individual removable compartment containing protection and control equipment for an individual motor. In International Electrotechnical Commission ("IEC") applications, the term "drawer" may be used. In the present disclosure, the terms "bucket" and "drawer" may be used interchangeably.

It will be appreciated that terms such as "right," "left," "top," "bottom," "above," and "side," as used herein, are merely for ease of description and refer to the orientation of the systems, features, and/or components shown in the figures. It should be understood that any orientation of the systems, features, and/or components of the present disclosure is within the scope of the present disclosure.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Certain aspects of some embodiments disclosed herein may be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer or other electronic device to perform processes described herein. The non-transitory computer and/or machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit ("ASIC"), PAL, PLA, PLD, field programmable gate array ("FPGA"), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices ("IEDs") that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers ("PLCs"), programmable automation controllers, input and output modules, governors, exciters, statcom controllers, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Figure 1:
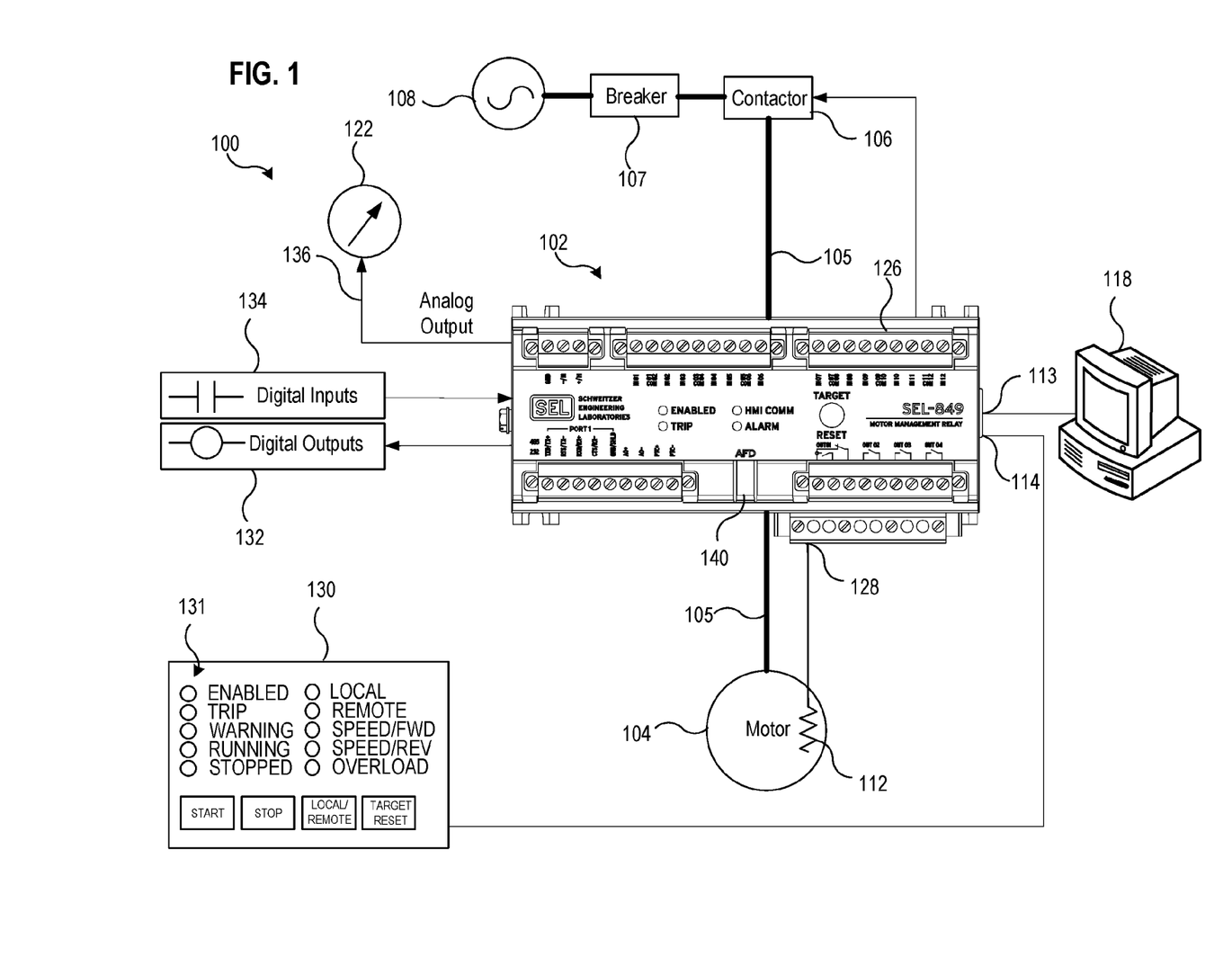
FIG. 1 illustrates a functional block diagram of a control system incorporating a motor management relay that includes an optical arc-flash detection system consistent with embodiments disclosed herein.

FIG. 1 illustrates a block diagram of a control system 100 incorporating a motor management relay 102 consistent with embodiments disclosed herein. A motor management relay may be used in a variety of applications, including pumping applications for water, chemicals, and petroleum; air-based applications, including fans, blowers, air handlers, and compressors; chiller applications, such as compressors and air-conditioning; and/or applications involving bulk materials, such as conveyors, crushers, screeners, feeders, augers, and bucket elevators.

Motor management relay 102 is configured to monitor and protect a motor 104 by monitoring one or more electrical conductors 105 configured to provide electrical power to motor 104. Motor management relay 102 may provide a variety of functions, including thermal protection, detection and suppression of electrical arc events, performance monitoring, process protection, and include a human-machine interface ("HMI") and a communications system for relaying information regarding electrical current provided to motor 104. Motor management relay 102 may also include one or more ports and/or sensors that enable these functions and allow for communication of information to or from motor management relay 102. Specifically, motor management relay 102 may be configured to interface with a contactor 106 via a contactor control port 126. Contactor 106 may be disposed in the electrical path between a source of electrical power 108 (e.g. an electrical grid, a generator, etc.) and motor 104, such that contactor 106 may be selectively actuated in order to disrupt the flow of electrical power to motor 104. An appropriate signal generated by contactor control port 126 may selectively actuate contactor 106 in order to disconnect motor 104 from source of electrical power 108. According to various embodiments, contactor control port 126 may be embodied as an EIA-232 or EIA-485 serial port. According to certain embodiments, contactor 106 may be configured to provide connection capability for motors drawing up to 128 A and 690 V.

A breaker 107 may also be disposed in the electrical path between the source of electrical power 108 and motor 104. According to certain embodiments, motor management relay 102 may also be configured to selectively actuate breaker 107 in order to disrupt the flow of electrical current from source of electrical power 108 to motor 104.

According to various embodiments, system 100 may comprise a variable frequency drive and motor 104 may comprise an induction motor. According to such embodiments, motor management relay 102 may monitor a root mean square ("RMS") value of current supplied to motor 104. In this operating mode, the overcurrent protection elements of motor management relay 102 may monitor RMS current magnitudes that include both fundamental and harmonic content. In other operating modes, motor management relay 102 may use 50 or 60 Hz fundamental frequency magnitudes.

According to the illustrated embodiments, motor management relay 102 comprises a central monitoring system port 113 and an HMI port 114. Central monitoring system port 113 and HMI port 114 may, according to various embodiments, be implemented using Ethernet. Other embodiments may incorporate other types of communications media and/or communications protocols. HMI port 114 may be in communication with an HMI panel 130, which may provide information in a human-readable format to a user relating to the operation of motor 104 and the characteristics of electrical power delivered to motor 104. For example, HMI panel 130 may provide an indication of whether motor management relay 102 is enabled, whether a trip condition has been detected, whether a warning condition has been detected, whether motor 104 is running, whether motor 104 is stopped, whether motor management relay 102 is operating in a local or remote mode, whether motor 104 is operating at a first speed (e.g., forward) or a second speed (e.g., reverse), whether an overload condition has been detected, and/or the like. According to the illustrated embodiments, a plurality of status indicators 131 may correspond to each of the above-described indications. Status indicators 131 may be embodied as LEDs or multicolor LEDs. For example, when motor management relay 102 is operating under normal conditions, status indicators 131 may all be a single color (e.g. green). An abnormal condition may be designated by changing the color (e.g. to red) of the appropriate status indicator allowing a user to readily distinguish the status indicator relating to the abnormal condition.

Motor management relay 102 may be in communication with a distributed control system 118. Distributed control system 118 may communicate with motor management relay 102 using one or more communications protocols including, for example, Modbus® RTU, Modbus TCP, IEC 61850, and/or the like. Distributed control system 118 may be responsible for monitoring and controlling a power generation and delivery system by implementing protection and monitoring schemes. Although not shown in the illustrated embodiments, distributed control system 118 may also communicate with a variety of IEDs configured to gather monitored system data relating from the power generation and delivery system from protective equipment included in the system. Distributed control system 118 may be configured to coordinate protection activities of monitored equipment under its control. Further, distributed control system 118 may be in communication with one or more other distributed control systems and/or a central control system (e.g. a SCADA system), and may facilitate the transmission of data and control instructions from a plurality of connected devices.

Motor management relay 102 may include digital inputs 134, digital outputs 132, a thermistor input 138, and an analog output 136. Analog output 136 may be configured to interface with a panel meter 122. Panel meter 122 may provide, for example, an indication of the electrical power being delivered to motor 104. Thermistor input 138 may allow for motor management relay 102 to receive information relating to the operating temperature of motor 104. Digital inputs 134 and digital outputs 132 may provide for communication between motor management relay 102 and other motors (not shown).

With fan-cooled motors, a reduction of the motor speed may reduce the cooling air flow of the fan. This could result in motor overheating, especially in reduced-speed and full-torque applications. According to various embodiments, a dynamic full load amperage ("FLA") calculation may reduce the allowed FLA as the motor speed is reduced, thereby providing thermal protection that is automatically matched to the motor speed. This thermal protection may be complemented by placement of a thermistor 112 in contact with motor 104. Thermistor 112 may further be in contact with thermistor input 138 and may provide an indication of the temperature of motor 104 to motor management relay 102.

Motor management relay 102 may further comprise an optical sensor 140 configured to detect the occurrence of an optical event. As described above, electrical arcing events may generate electro-optical radiation in the visible and ultraviolet ranges. Optical sensor 140 may be configured to detect the occurrence of an optical event and to gather data regarding the optical event (e.g., duration, intensity, etc.). Information gathered using optical sensor 140 may be analyzed by motor management relay 102 in order to determine whether a detected optical event corresponds to an electrical arc event. Analysis of the detected optical event analysis may, according to certain embodiments, be complemented by analysis of the electrical current provided to motor 104 via contactor 106.

Figure 2:
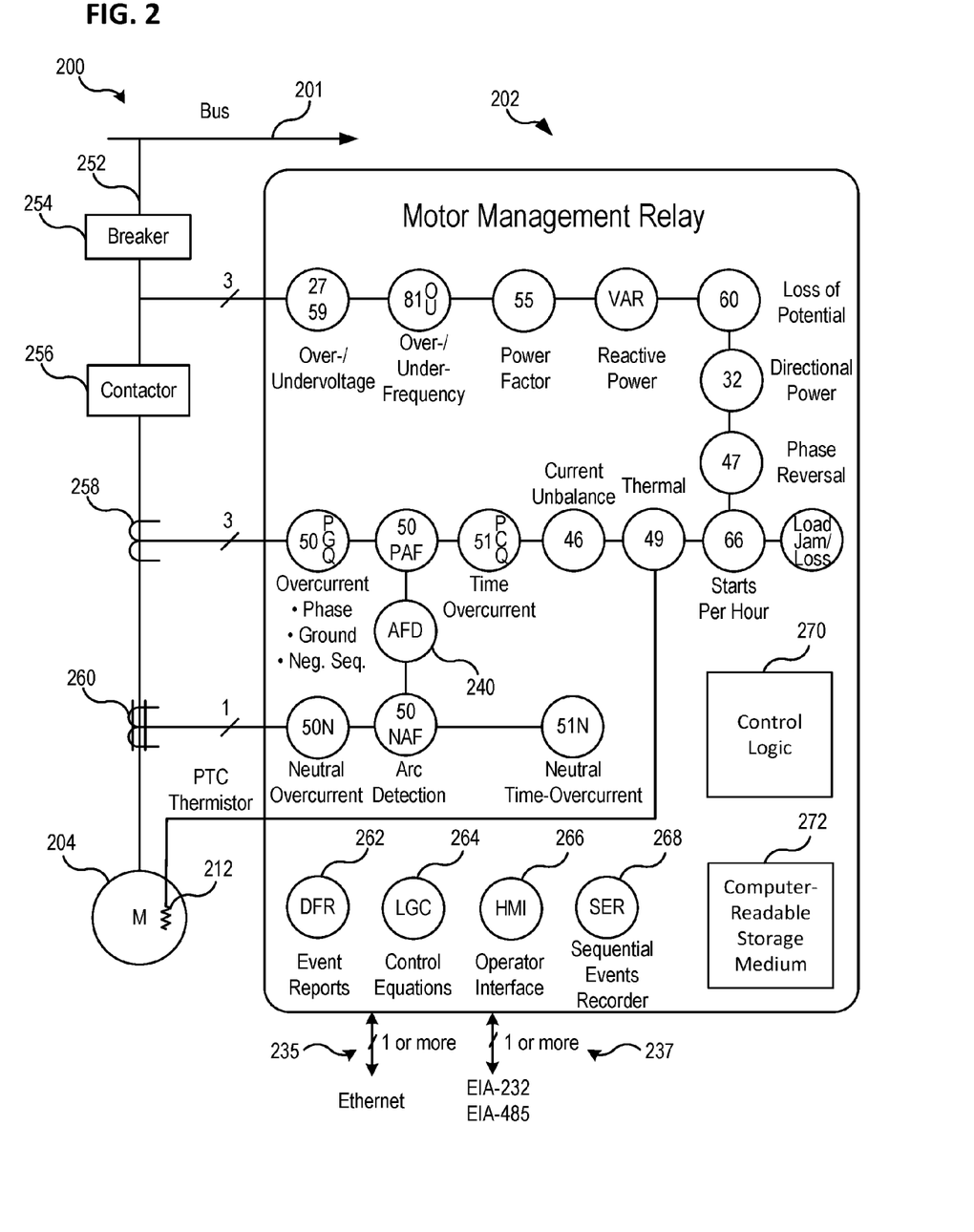
FIG. 2 illustrates a functional block diagram of a system including a motor management relay that incorporates an arc flash detection sensor configured to detect an optical event that may be associated with an electrical arc event consistent with embodiments disclosed herein.

FIG. 2 illustrates a functional block diagram of a system 200 including a motor management relay 202 that incorporates an arc flash detection sensor configured to detecting an optical event that may be associated with an electrical arc event consistent with embodiments disclosed herein. Certain functional units shown in FIG. 2 are labeled using the ANSI standard device numbers as set forth in ANSI/IEEE Standard C37.2 and C37.2-2008. An electrical bus 201 may provide power to motor leads 252, which in turn provide power to a motor 204. A breaker 254 may be disposed between bus 201 and motor 204 so that motor 204 can be electrically isolated from bus 201. Breaker 254 may be controlled by motor management relay 202, which may actuate the breaker 254 such that electrical current to motor 204 may be interrupted upon the detection of specified conditions. A contactor 256 may also be in communication with motor leads 252. Contactor 256 may be configured to control and suppress electrical arcs that may be associated with energizing and de-energizing motor 204. Contactor 256 may also be in communication with a motor management relay 202 and may be selectively actuated in order to interrupt the flow of electrical current from bus 201 to motor 204.

A plurality of current transformers 258, 260 may be used to monitor electrical conditions associated with motor leads 252. According to the illustrated embodiment, a three-phase power system is shown. Three current transformers 258, one for each phase of a three-phase power system, may provide inputs to motor management relay 202 to according to certain embodiments, such as the embodiments illustrated in FIGS. 5A-5E. Current transformers 258 may be integrated within motor management relay 202 or motor management relay 202 may comprise inputs to which current transformers 258 may be connected. A balanced current transformer 260, or zero sequence sensor, may also provide an input to motor management relay 202. Again, according to certain embodiments, such as the embodiments illustrated in FIGS. 5A-5E, balanced current transformer 260 may be integrated within motor management relay 202 or may be separate from motor management relay 202.

In addition to the functions designated using ANSI Device Numbers, motor management relay 202 may also incorporate an optical arc flash detection system 240. Optical arc flash detection system 240 may include an optical sensor configured to detect the occurrence of an electrical arc event. Further, optical arc flash detection system 240 may receive information from current transformers 258 and 260, and thus may rely on multiple sensor inputs in determining whether to actuate breaker 254 or contactor 256 and interrupt the flow of electrical current to motor 204. According to some embodiments, in order to detect and suppress an electrical arc event as quickly as possible, motor management relay 202 may actuate breaker 254 and/or contactor 256 based solely upon input from optical arc flash detection system 240. According to other embodiments, in which continuous operation of motor 204 is desirable, prior to actuating breaker 254 and/or contactor 256, an electrical arc event detected by optical arc flash detection system 240 may be verified by data gathered using current transformers 258 and/or 260.

In addition to providing monitoring of electrical characteristics associated with motor 204, motor management relay 202 may also provide thermal protection. A thermistor 212 may be disposed in proximity to motor 204 in order to gather information relating to the operating temperature of motor 204. Upon the detection of an elevated operating temperature, motor management relay 202 may invoke an appropriate control response in order to prevent damage to motor 204.

Motor management relay 202 may also provide an event report generation system 262, a control equation system 264, and operator interface system 266, and a sequential events recorder system 268. Each of systems 262, 264, 266, and 268 may be implemented as a combination of hardware and/or software. Motor management relay 202 may further comprise control logic 270 and a non-transitory computer-readable storage medium 272. Non-transitory computer-readable storage medium 272 may store instructions executable on a processor in order to generate event reports, implement control equations, generate an HMI interface, and record sequential events. Control logic 270 may be configured to process communications received via various input and output ports 235 and 237. Control logic 270 may operate using any number of suitable processing speeds and architectures. Control logic 270 may be configured to perform various algorithms and calculations described herein. Control logic 270 may be embodied as a general purpose integrated circuit, an ASIC, a field-programmable gate array, and other programmable logic devices.

According to various embodiments one or more Ethernet ports 235 and one or more EIA-232/485 ports may facilitate communication between motor management relay 202 and other sensors and/or IEDs. According to one embodiment, a plurality of external optical arc-flash detection sensors (not shown) may communicate with motor management relay 202 via one or more of ports 235 and 237. According to such embodiments, the plurality of external optical arc-flash detection sensors may be positioned throughout an area in which are-flash events may occur. The use of multiple arc-flash detection sensors in different locations may increase the likelihood of detection of electro-optical radiation generated by and electrical arc event. In addition, ports 235 and 237 may facilitate communication between motor management relay 202 and higher level control systems (e.g., a distributed control system, a SCADA system, etc.) or a peer device (e.g., another motor management relay). According to still other embodiments, one or more ports 235 and 237 may be utilized for communication with an HMI (not shown) and may operate in conjunction with operator interface system 266. According to some embodiments, a connection between motor management relay 202 and an external HMI (e.g., the HMIs illustrated in FIGS. 4A and 4B) may utilize an Ethernet connection. Ports 235 and 237 may be configured for communication with one or more of an external optical arc-flash detection sensor, a higher level control system, a peer device, and an HMI.

Figure 3:
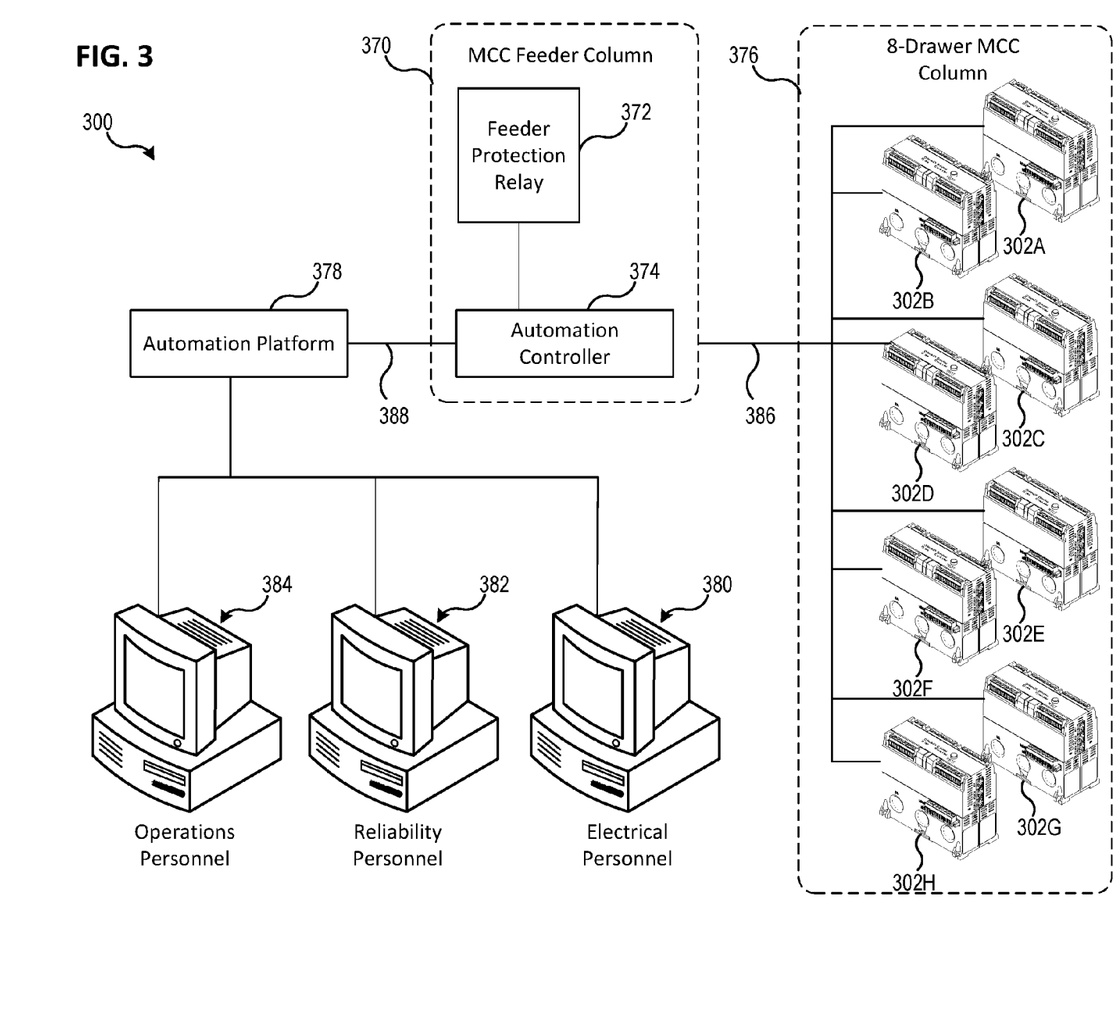
FIG. 3 illustrates a system-level block diagram including a plurality of motor management relays consistent with embodiments disclosed herein.

FIG. 3 illustrates a block diagram of a system 300 including a plurality of motor management relays 302A-302H consistent with embodiments disclosed herein. The plurality of motor management relays 302A-302H may be contained in an 8-drawer MCC column 376, which is fed by an MCC theater column 370. MCC theater column 370 may comprise a feeder protection relay 372 and an automation controller 374. Automation controller 374 may be in communication with each of the plurality of motor management relays 302A-302H via a communications link 386. According to some embodiments, communications via communications link 386 may be made according to the EIA-232 standard, the EIA-485 (single or dual) standard, the Ethernet standard, the SONET standard, and/or any other suitable standard.

Automation controller 374 may be in communication with feeder protection relay 372. Automation controller 374 may be embodied, as a real-time automation controller ("RTAC") (e.g., Model No. SEL-3530, available from Schweitzer Engineering Laboratories ("SEL") of Pullman, Wash.). Feeder protection relay 372 may be embodied as a Model No SEL-751A, available from SEL. Automation controller 374 may further be in communication with automation platform 378. Automation platform 378 may be embodied as an embedded automation computing platform (e.g., Model No. SEL-3354, available from SEL). Automation platform 378 may be in communication with a variety of higher level systems, such as systems used by electrical personnel 380, systems used by reliability personnel 382, and systems used by operations personnel 384. A communications link 388 between automation controller 374 and automation platform 378 may allow for communication via the Ethernet standard, the SONET standard, and/or any other suitable standard.

System 300 provides a multilayered approach for automation and control of the plurality of motors monitored by each of motor management relays 302A-302H. Further, information gathered by motor management relays 302A-302H may be aggregated and transmitted to relevant personnel (e.g. operations personnel, reliability personnel, and electrical personnel) as appropriate. System 300 may provide a variety of benefits, including redundancy, security, data gathering, data distribution, and data translation. Accordingly to some embodiments, motor management relays 302A-302H may be configured to communicate with automation controller 374 using the EIA-485 standard. Automation controller 374 may be configured to convert data received from motor management relays 302A-302H according to the EIA-4852 standard to Ethernet. In certain embodiments, automation platform 378 may serve as a controller and/or SCADA gateway in system 300. According to alternative embodiments, motor management relays 302A-302H may be connected directly to any higher level system that supports EIA-485 or Ethernet communications, using Modbus® RTU, Modbus TCP, or IEC 61850 protocols. Automation controller 374 may be configured to provide a secure access point for system 300. Automation controller 374 may also provide central authentication, role-based user authentication, access logs, and secure engineering access to system 300.

Figure 4A:
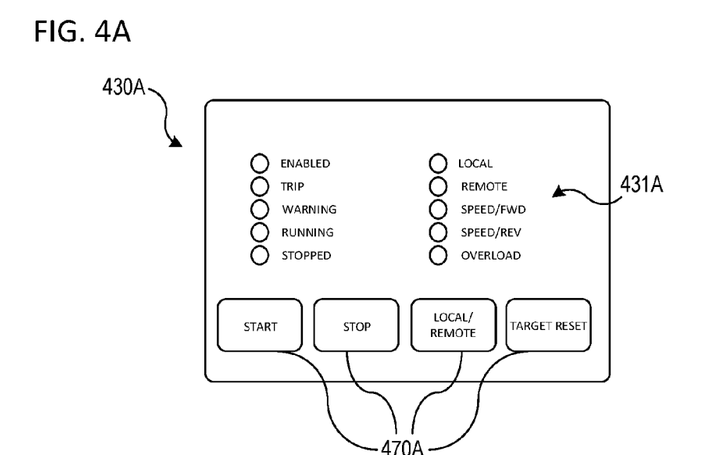
FIG. 4A illustrates a human-machine interface operable in connection with a motor management relay consistent with embodiments disclosed herein.
Figure 4B:
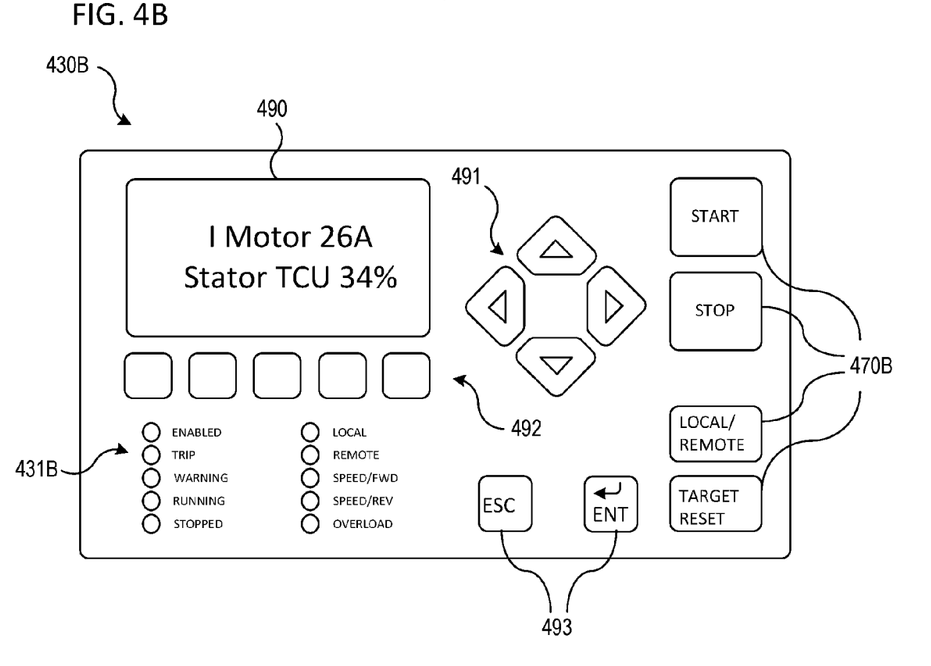
FIG. 4B illustrates a human-machine interface including a display and additional related controls operable in connection with a motor management relay consistent with embodiments disclosed herein.

FIGS. 4A and 4B illustrate HMIs 430A and 430B, which may be operable in connection with a motor management relay (not shown) consistent with embodiments disclosed herein. Each of HMIs 400 and 450 may include a plurality of status indicators 431A and 431B. Status indicators 431A and 431B may be embodied as LEDs or multicolor LEDs. For example, when motor management relays associated with motor management relays 430A and 430B are operating under normal conditions, status indicators 431A and 431B may all be a single color (e.g. green). An abnormal condition may be designated by changing the color (e.g. to red) of the appropriate status indicator to allow a user to readily distinguish a status indicator relating to the abnormal condition. In addition, HMIs 430A and 430B may include a plurality of fixed function input keys 470A and 470B, such as "start," "stop," "local/remote," and "target reset." Actuation of fixed function input keys 470A, 470B may invoke the labeled function associated with each respective key.

HMI 430B may also include a display 490, directional keys 491, soft keys 492, and/or control keys 493. Display 490, directional keys 491, soft keys 492, and control keys 493 may facilitate user interaction with HMI 430B. For example, a plurality of options may be presented to a user on display 490. The user may select a desired option using soft keys 492 or directional keys 491. Once a desired option is selected the user may click control keys 493 to select or cancel the selected option.

Figure 5A:
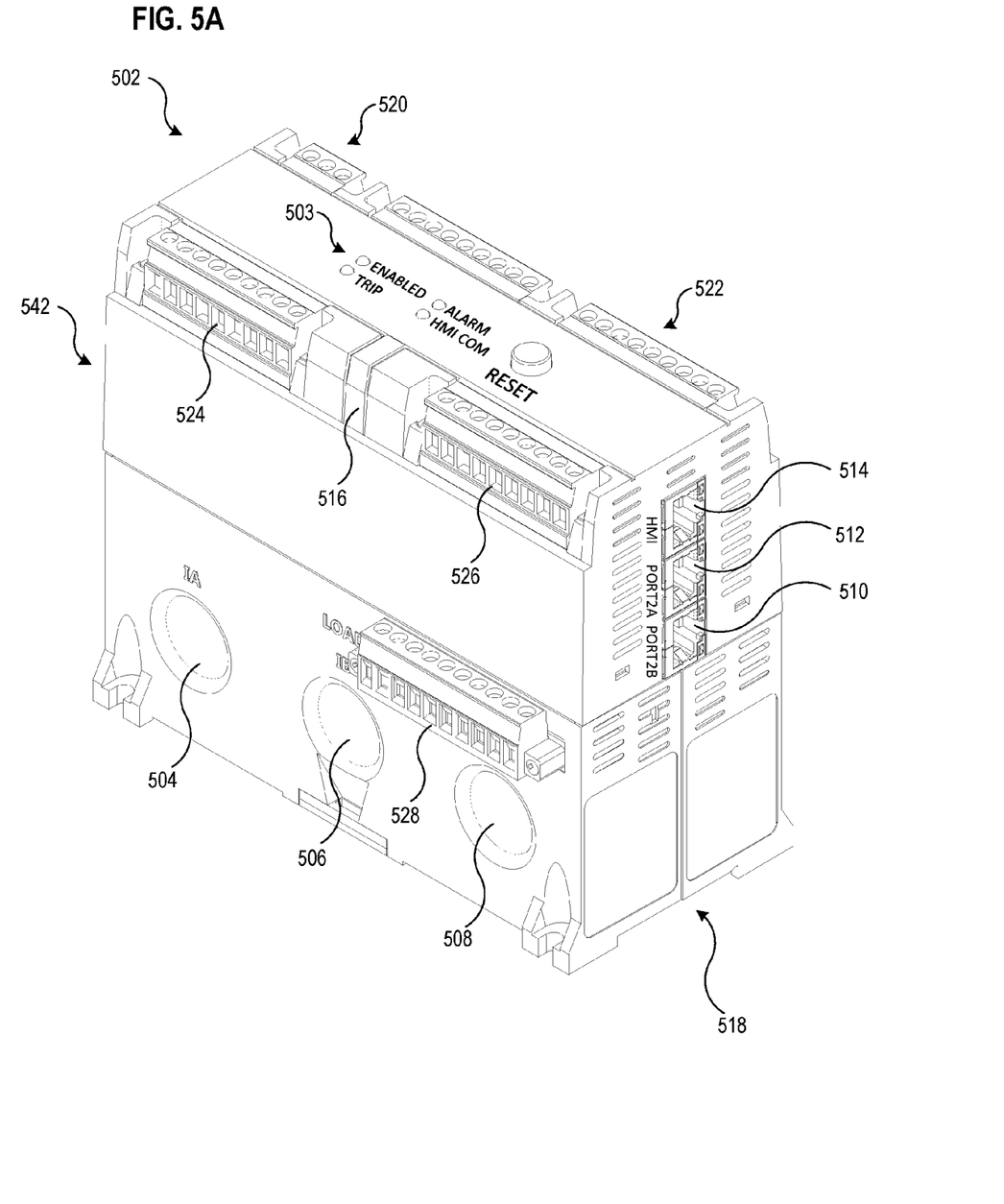
FIG. 5A illustrates an isometric view of a motor management relay that incorporates an arc flash detection system and current sensors within a housing consistent with embodiments disclosed herein.

FIG. 5A illustrates an isometric view of a motor management relay 502 that incorporates a plurality of current sensors consistent with embodiments disclosed herein. Motor management relay 502 may provide a variety of functions, including thermal protection, arc flash detection, performance monitoring, an HMI, process protection, and a communications system for relaying information regarding electrical current provided to the motor. Motor management relay 502 may include an optical arc flash detection sensor 516 configured to detect the occurrence of an arc flash associated with an electrical arcing event. In response to a detected electrical arc event, motor management relay 502 may be configured to take protective action in order to minimize damage to a motor and/or other equipment associated with an electrical arc event.

Figure 5B:
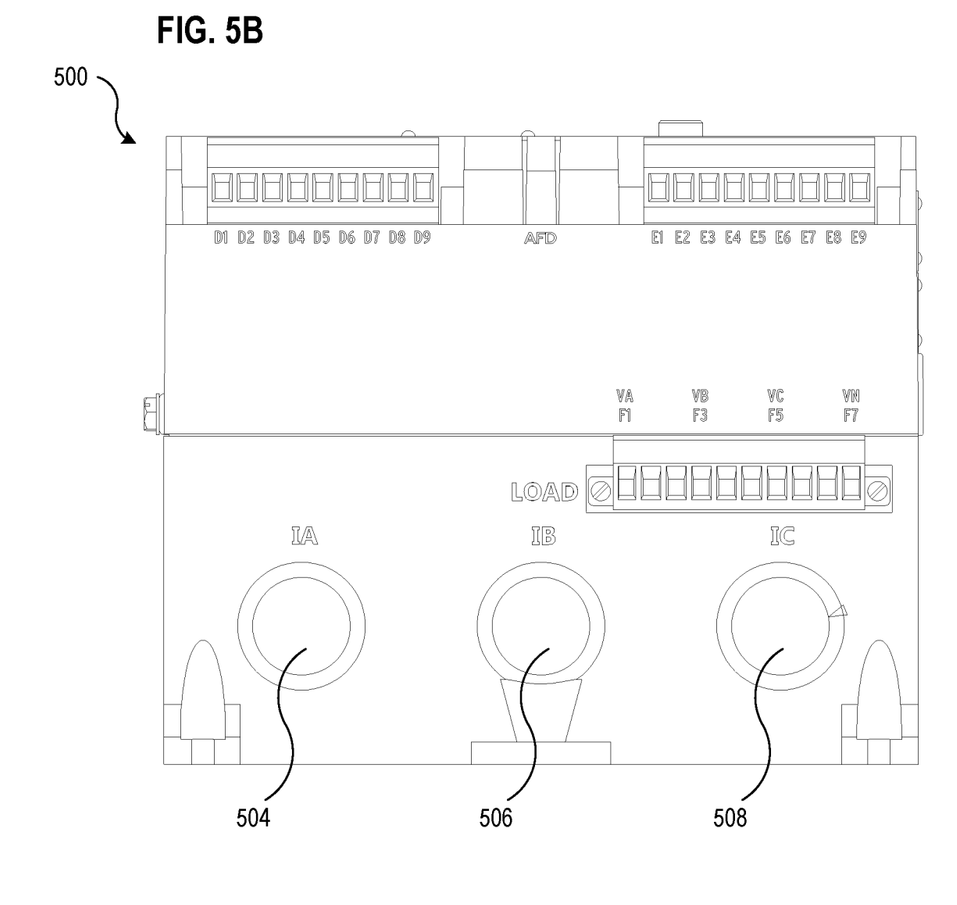
FIG. 5B illustrates a front view of the motor management relay of FIG. 5A.

Various embodiments of a motor management relay 502 according to the present disclosure may be configured to have a small form factor. Various features may be incorporated into the relay to reduce the size of motor management relay 502. Further, various features may be incorporated into the motor management relay 502 to improve the ease of installation or usability. According to the illustrated embodiments, motor management relay 502 may incorporate a plurality of current sensors (e.g., current sensors 530, 534, 536, and 538 illustrated in FIGS. 5C-5E), which in addition to reducing size, may also reduce installation time and may facilitate installation in an MCC drawer or bucket. In certain embodiments, current sensors may be disposed around apertures 504, 506 and 508. Apertures 504, 506, and 508 may be associated with three-phase power feeds connected to a motor. Each aperture 504, 506, and 508 may be surrounded by a Rogowski coil, as disclosed in co-pending application Ser. No. 13/479,139, the entirety of which is incorporated herein by reference. In addition, motor management relay 502 may also incorporate a zero-sequence current transformer. As illustrated in FIG. 5B, apertures 504, 506, and 508 may extend through motor management relay 502. Three conductors (not shown) may be routed through apertures 504, 506, and 508 and may provide three-phase power to an electrical motor (not shown).

Returning to FIG. 5A, motor management relay 502 may also include a plurality of communications ports 510, 512, and 514. Communications ports 510, 512, and 514 may allow for motor management relay 502 to communicate with a variety of control systems (not shown) and/or HMI devices, such as HMI interfaces 430A and 430B shown in FIGS. 4A and 4B, respectively. In addition, motor management relay 502 may be configured to communicate using a variety of communications protocols, such as Modbus® RTU, Modbus TCP, IEC 61850, and/or the like.

According to the illustrated embodiments, communications port 514 is illustrated as an HMI port; however, according to alternative embodiments, any communications port may be utilized for an HMI port. In addition, certain information may be displayed by way of indicators 503 disposed on top of motor management relay 502. According to the illustrated embodiment, indicators may be provided to display whether the device is enabled, whether an alarm condition has been detected, whether a trip condition has been detected, and the status of communication with an HMI.

HMI port 514 may allow for the placement of an HMI panel near motor management relay 502 while permitting flexibility in installation. According to certain embodiments, an HMI panel may be disposed on the exterior of an MCC drawer or bucket. According to various embodiments, power may be provided to the HMI via the same cable used for communication between motor management relay 502 and an HMI. Specifically, and RJ-45 cable may be used to provide both power and data communications between the HMI and motor management relay 502.

Motor management relay 502 may incorporate a variety of contact input/output ports ("I/O ports") 522, 524, 526, and 528 that facilitate communication with various devices and systems. According to the illustrated embodiment I/O ports 524 and 526 may be embodied as EIA-232 or EIA-485 serial ports, and I/O port 528 may be embodied as a direct-connect voltage input. Port 522 may be embodied as an EIA-232 or EIA-485 serial port. Port 520 may serve as a connection point for a power supply.

According to the illustrated embodiments, motor management relay 502 may incorporate an optical arc flash detector 516. A motor control cabinet may have a large fault-current potential, which may result in increased danger associated with electrical arc events. Optical detection of electro-optical radiation associated with an electrical arc event may be utilized to improve protection and reduce total arc flash energy. Upon the detection of an electrical arc event, the circuit providing power to the motor may be interrupted to prevent damage to the motor and other equipment.

As illustrated in FIG. 5A, arc flash detector 516 is partially disposed on two sides (i.e., the top side and the front side) of motor management relay 502. Such a configuration may allow arc flash detector 516 to detect arc flashes in at least two axes or planes. Accordingly, arc flash detector 516 may be referred to as a two-axis sensor. According to certain embodiments, multiple arc flash detectors may be disposed on a housing of a motor management relay. In addition, or in the alternative, a plurality of external arc flash detectors may be in electrical communication with motor management relay 502 via one or more I/O ports (e.g., I/O ports 522, 524, 526, and/or 528).

Motor management relay 502, according to various embodiments may be utilized in connection with a small motor control center drawer or bucket. Motor management relay 502 may be configured to operate in conjunction with various mounting systems. According to the illustrated embodiment, motor management relay 502 incorporates a DIN rail-mounting system 518. Further, a two-axis sensor, such as arc flash detector 516 may occupy a relatively small area of a housing 542, and may thus facilitate installation of motor management relay 502 in MCC drawers or buckets, or other spatially confined areas. The illustrated configuration may be installed, for example, in a configuration in which arc flash detector 516 is oriented in a direction where an arc flash event may occur, while the back side of motor management relay abuts the perimeter of an MCC drawer or bucket.

Motor management relay 502 may provide information relating to the operation of a monitored motor. Such information may include information relevant to the operation and reliability of the motor, such as operating statistics, motor starts, motor overload, temperature reports, two-speed motor operation, and motor restart after power restoration. In addition, information regarding the electrical characteristics may also be collected, such as voltage and current provided to the motor, the power factor associated with the motor, the load profile, etc. Motor management relay 502 may also allow for integration with a control system (not shown) responsible for monitoring and controlling a power distribution system. The control system may allow for integration with a variety of control and monitoring schemes implemented using motor management relay 502.

Figure 5C:
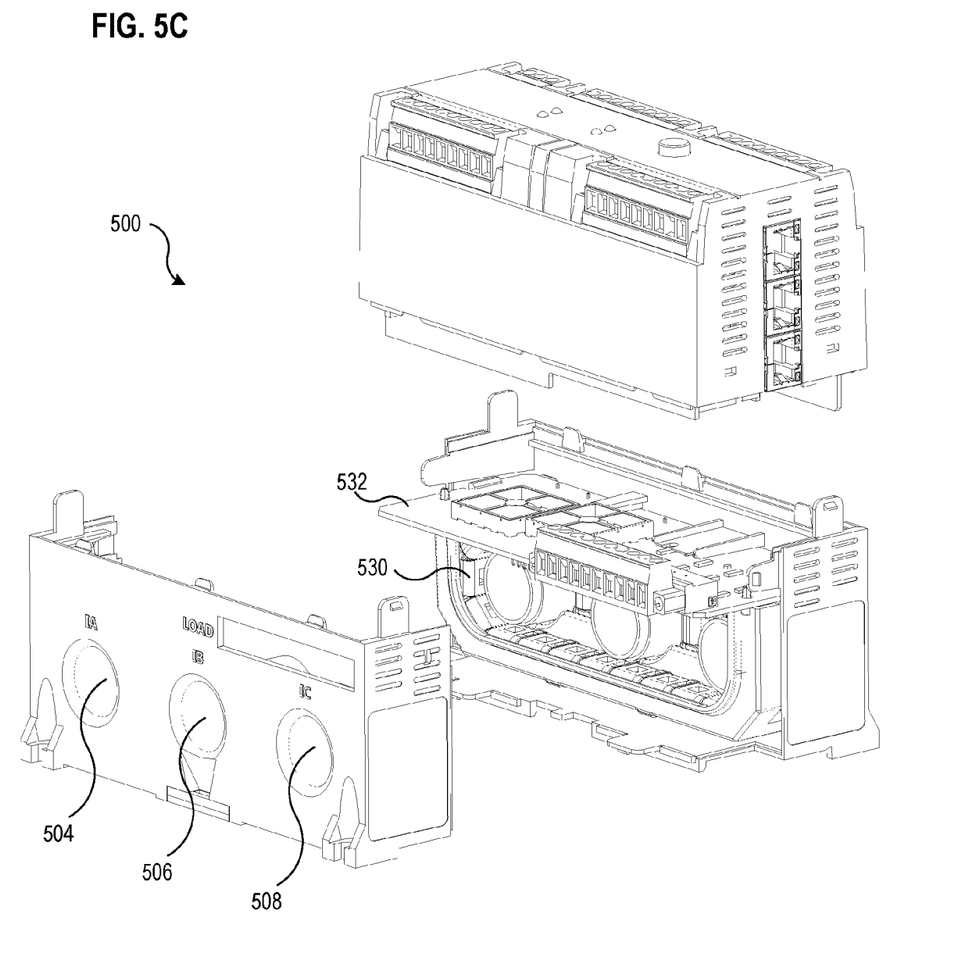
FIG. 5C illustrates a partially exploded view of the motor management relay of FIG. 5A, and illustrates a printed circuit board to which a plurality of current sensors may be mounted consistent with embodiments disclosed herein.

FIG. 5C illustrates an exploded view of motor management relay 502. Motor management relay 502 includes a printed circuit board ("PCB") 532, to which a plurality of current sensors may be mounted. Although only a single current sensor 530 is shown in FIG. 5C, additional current sensors 534, 536, and 538 are illustrated in FIG. 5D.

Figure 5D:
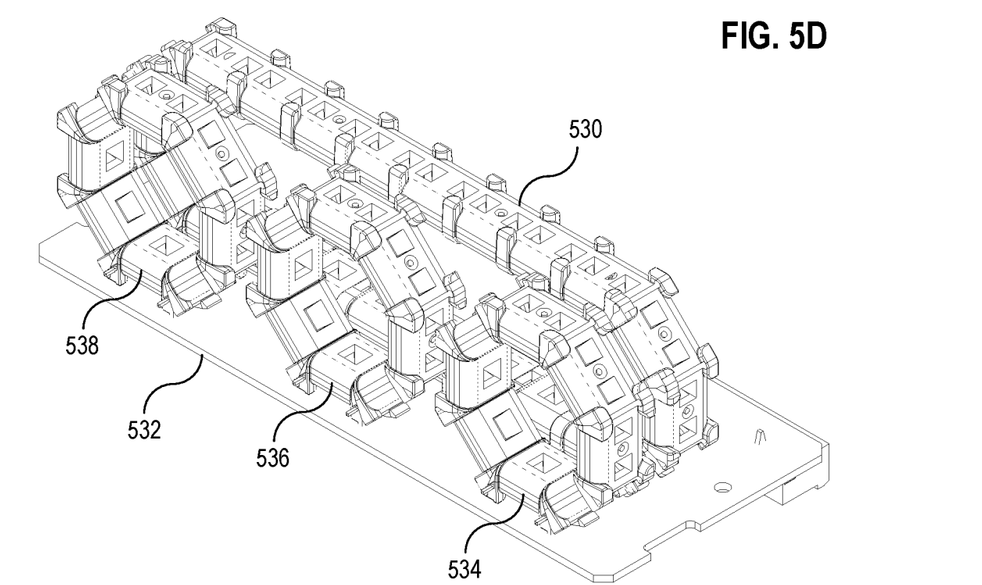
FIG. 5D illustrates an isometric view of the printed circuit board and the plurality of current sensors shown in FIG. 5C.

As illustrated in FIG. 5D, a plurality of current sensors 530, 534, 536, and 538 may be incorporated into motor management relay 502 as illustrated in FIGS. 5A-5C. Current sensor 530 may be configured as a zero-sequence current sensor, while current sensors 534, 536, and 538 may each be associated with a respective conductor (not shown) passing through apertures 508, 506, and 504 (e.g., as shown in FIG. 5C), respectively, and providing electrical power to a motor (not shown). Electrical characteristics associated with each conductor may be monitored using current sensors 534, 536, and 538. Electrical characteristics associated with each of the conductors may be gathered using current sensor 530, and such electrical characteristics may be used to generate zero sequence information associated with the system.

Figure 5E:
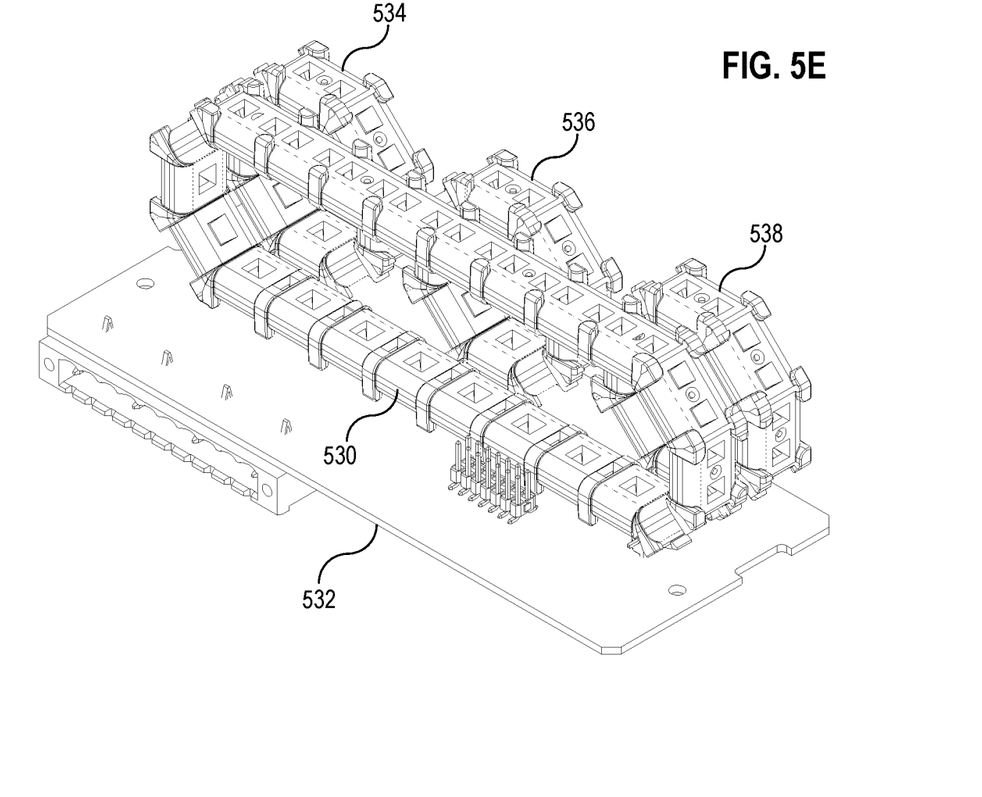
FIG. 5E illustrates a rotated view of the printed circuit board and the plurality of current sensors shown in FIG. 5D.

As illustrated in FIGS. 5D and 5E, current sensors 530, 534, 536, and 538 may each be mounted to PCB 532. As discussed above, the bobbins used in forming current sensors 530, 534, 536, and 538 may include PCB connection pins that may allow for the current sensors to be directly mounted to PCB 532.

Figure 6:
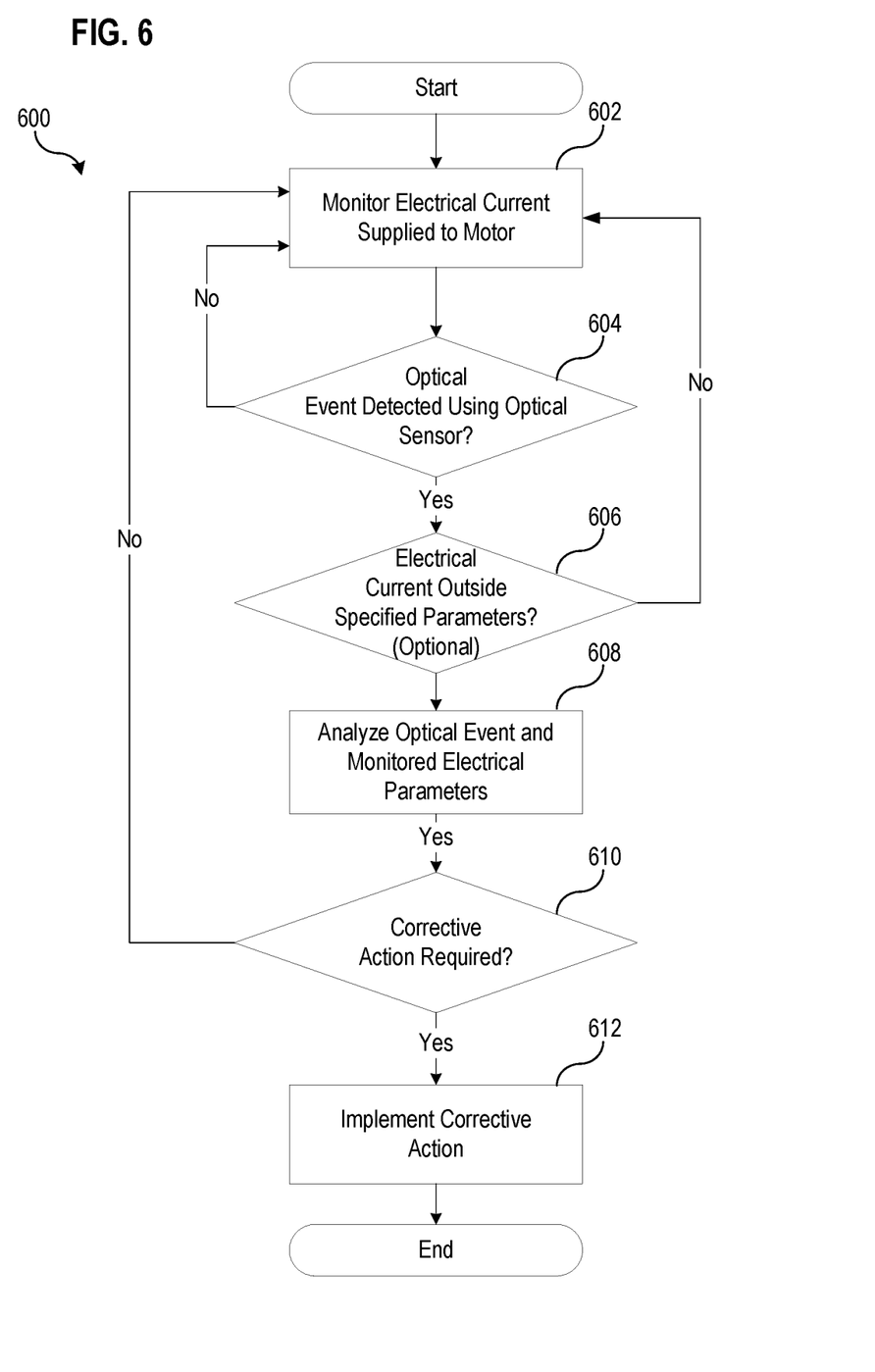
FIG. 6 illustrates a flow chart of a method for detecting an electrical arc event based upon the detection of an arc flash associated with an electrical arc event and optionally based upon monitored electrical parameters consistent with embodiments disclosed herein.

FIG. 6 illustrates a flow chart of a method 600 for detecting an electrical arc event consistent with embodiments disclosed herein. Method 600 may be implemented, according to various embodiments utilizing a motor management relay. At 602, electrical currents applied to a motor may be monitored. Monitoring of the electrical currents applied to the motor may be performed using one or more current transformers. In addition, other electrical characteristics may also be monitored, such as voltage, frequency, phase, and/or the like. At 604, it may be determined whether an electrical arc event has been detected using an optical arc-flash sensor. As described above in connection with various embodiments, a motor management relay may comprise an optical arc-flash sensor. Optionally, at 606, it may be determined whether electrical current supplied to the motor is outside of specified parameters. For example, a limit may be established for the amount of current drawn by the motor. If a system implementing method 600 detects an optical event, the system may also determine the amount of current being drawn by the motor in order to determine whether the optical event is associated with an electrical arc.

Information regarding the optical event, and optionally the monitored electrical characteristics associated with the motor, may be analyzed at 608. Analysis of the information regarding the optical event may include an analysis of the duration and intensity of detected electro-optical radiation. A system implementing method 600 and may compare one or more characteristics of a detected optical event to one or more parameters in order to determine whether the detected optical event was caused by an electrical arc event or was caused by some other source. For example, the duration and intensity of the detected optical event may be analyzed to determine whether the detected optical event likely corresponds to an electrical arc event. Analysis of the electrical conditions associated with a motor may also be undertaken to determine whether an electrical arc event is occurring and whether protective action should be undertaken to suppress the electrical arc event.

At 610, it may be determined whether corrective action is required. According to various embodiments, a determination of whether corrective action is required may be based on the detection of the optical flash associated with the electrical arc event using the optical sensor, and optionally based upon the detection of electrical current provided to the motor outside of specified parameters. At 612, corrective action may be implemented. Corrective action may include, among other things, interruption of electrical current flowing to the motor. A variety of systems and methods for determining whether corrective action should be taken in response to an optical event and electrical parameters outside of specified ranges are disclosed in U.S. Patent Publication No. 2010/0073830, the entirety of which is incorporated herein by reference.

While specific embodiments and applications of the disclosure have been illustrated and described, the disclosure is not limited to the precise configuration and components disclosed herein. Various modifications, changes, and variations may be made in the arrangement, operation, and details of the methods and systems of the disclosure without departing from the spirit and scope of the disclosure.

What is claimed is:

1. A motor management relay, comprising:
    a housing comprising two sides;
    a plurality of current sensors disposed within the housing configured to monitor the flow of electrical current to a motor;
    an optical arc-flash sensor configured to detect an optical event and integrated with the housing such that the arc-flash sensor is at least partially disposed on the two sides of the housing;
    control logic comprised within the housing and configured to analyze the optical event and determine whether the optical event corresponds to an electrical arc event; and, a control port disposed on the housing and in communication with the control logic, the control port configured to issue an instruction to an associated protective device to implement a protective action based on a determination that the optical event corresponds to an electrical arc event.

2. The motor management relay of claim 1, wherein the two sides are adjacent sides.

3. The motor management relay of claim 1, wherein the control logic is further configured to analyze the flow of electrical current to the motor and the optical event to determine that the optical event corresponds to an electrical arc event.

4. The motor management relay of claim 1, wherein the control logic is further configured to determine whether the optical event corresponds to an electrical arc event using at least one of the plurality of current sensors.

5. The motor management relay of claim 1, wherein the housing comprises a plurality of apertures, and wherein each aperture is associated with at least one of the plurality of current sensors.

6. A motor management relay, comprising:
a housing comprising two sides;
a two-axis optical arc-flash sensor configured to detect an optical event and integrated with the housing of the motor management relay such that the arc-flash sensor is at least partially disposed on the two sides of the housing;
control logic configured to:
determine whether an optical event corresponds to an electrical arc event using the arc-flash sensor; and,
analyze a flow of electrical current to the motor to determine an overcurrent condition of the motor; and,
a control port in communication with the control logic configured to issue an instruction to an associated protective device to implement a protective action based on a determination that the optical event corresponds to an electrical arc event.

7. The motor management relay of claim 6, wherein the two sides are adjacent sides.

8. The motor management relay of claim 6, wherein the control logic is further configured to analyze a flow of electrical current to the motor and the optical event to determine that the optical event corresponds to an electrical arc event.

9. The motor management relay of claim 6, further comprising a plurality of current sensors configured to monitor a flow of electrical current to a motor.

10. The motor management relay of claim 9, wherein the plurality of current sensors are disposed within the housing.

11. The motor management relay of claim 9, wherein the control logic is further configured to determine whether the optical event corresponds to an electrical arc event using at least one of the plurality of current sensors.

12. The motor management relay of claim 10, wherein the housing comprises a plurality of apertures, and wherein each aperture is associated with at least one of the plurality of current sensors.

13. The motor management relay of claim 6, wherein the housing comprises a form factor for installation of the motor management relay in one of a motor control center bucket and an International Electrotechnical Commission drawer.

14. A method of detecting an electrical fault associated with an electrical motor, the method comprising:
monitoring a flow of electrical current supplied to a motor with a motor management relay;
detecting an optical event indicative of an arc flash associated with an electrical arc using a two-axis optical sensor integrated at least partially on two sides of a housing of the motor management relay;
analyzing the optical event using control logic integrated within the housing;
determining that corrective action is required based on the optical event using the control logic;
generating a control signal using the control logic in the motor management relay to implement corrective action; and,
issuing an instruction using a control port integrated within the housing to an associated protective device to implement a protective action based on a determination that the optical event corresponds to an electrical arc event.

15. The method of claim 14, wherein the two axis optical sensor is disposed at least partially on two adjacent sides of the housing.

16. The method of claim 15, further comprising determining that corrective action is required based on the monitored current supplied to the motor.

17. The method of claim 14, further comprising analyzing the flow of electrical current supplied to the motor and the optical event to determine that the optical event corresponds to an electrical arc event.

18. A motor management relay, comprising:
a housing;
a plurality of current sensors configured to monitor the flow of electrical current to a motor;
an optical arc-flash sensor integrated with the housing of the motor management relay and configured to detect an optical event;
control logic comprised within the housing and configured to analyze the optical event and determine whether the optical event corresponds to an electrical arc event; and,
a control port disposed on the housing and in communication with the control logic, the control port configured to issue an instruction to an associated protective device to implement a protective action based on a determination that the optical event corresponds to an electrical arc event.

19. The motor management relay of claim 18, wherein the housing comprises a form factor for installation of the motor management relay in one of a motor control center bucket and an International Electrotechnical Commission drawer.

20. The motor management relay of claim 18, wherein the housing comprises at least two adjacent sides, and the optical arc-flash sensor is disposed on the two adjacent sides.

* * * * *